(12) United States Patent
Cresens (10) Patent No.: US 11,915,402 B2
(45) Date of Patent: Feb. 27, 2024

(54) METHOD AND SYSTEM TO CALCULATE THE POINT SPREAD FUNCTION OF A DIGITAL IMAGE DETECTOR SYSTEM BASED ON A MTF MODULATED QUANTUM-NOISE MEASUREMENT

(71) Applicant: AGFA NV, Mortsel (BE)

(72) Inventor: Marc Cresens, Mortsel (BE)

(73) Assignee: Agfa NV, Mortsel (BE)

( * ) Notice: Subject to any disclaimer, the term of this patent is extended or adjusted under 35 U.S.C. 154(b) by 402 days.

(21) Appl. No.: 17/421,974

(22) PCT Filed: Dec. 16, 2019

(86) PCT No.: PCT/EP2019/085262
§ 371 (c)(1),
(2) Date: Jul. 9, 2021

(87) PCT Pub. No.: WO2020/144002
PCT Pub. Date: Jul. 16, 2020

(65) Prior Publication Data
US 2022/0114704 A1    Apr. 14, 2022

(30) Foreign Application Priority Data
Jan. 9, 2019   (EP) .................................... 19150965

(51) Int. Cl.
*G06T 5/00*   (2006.01)
*G06T 7/00*   (2017.01)
*G01N 23/04*   (2018.01)
*G01N 23/083*   (2018.01)

(52) U.S. Cl.
CPC ........... *G06T 7/0002* (2013.01); *G01N 23/04* (2013.01); *G01N 23/083* (2013.01); *G06T 5/003* (2013.01); *G06T 7/97* (2017.01); *G01N 2223/04* (2013.01); *G01N 2223/40* (2013.01); *G06T 2207/10116* (2013.01); *G06T 2207/20032* (2013.01); *G06T 2207/30168* (2013.01)

(58) Field of Classification Search
CPC ......... G06T 7/0002; G06T 5/003; G06T 7/97; G06T 2207/10116; G06T 2207/20032; G06T 2207/30168; G01N 23/04; G01N 23/083; G01N 2223/04; G01N 2223/40
See application file for complete search history.

(56) References Cited

U.S. PATENT DOCUMENTS 9,916,656 B2 * 3/2018 Choi ..................... G06T 7/0012
10,152,774 B2 * 12/2018 Kang ....................... G06T 7/00

OTHER PUBLICATIONS

Baran et al., "Optimization of propagation-based x-ray phase-contrast tomography for breast cancer imaging," *Phys. Med. Biol.*, 62(6): 2315-2332 (Mar. 2017).

(Continued)

*Primary Examiner* — Phuoc Tran
(74) *Attorney, Agent, or Firm* — Leydig, Voit & Mayer, Ltd.

(57) ABSTRACT

This invention is related to a method to measure and calculate a point spread function PSF of an image detector system based on the analysis of quantum noise that is present in generic image acquisition data, and that is modulated by the transfer function of the digital imaging system. The method allows the calculation of the sharpness of a system without the need for image phantom recordings.

19 Claims, 4 Drawing Sheets

(56) References Cited

OTHER PUBLICATIONS

European Patent Office, International Search Report in International Patent Application No. PCT/EP2019/085262, 3 pp. (dated Feb. 7, 2020).

European Patent Office, Written Opinion in International Patent Application No. PCT/EP2019/085262, 7 pp. (dated Feb. 7, 2020).

Jeon et al., "Determination of point spread function for a flat-panel X-ray imager and its application in image restoration," *Nuclear Instruments and Methods in Physics Research Section A: Accelerators, Spectrometers, Detectors and Associated Equipment*, 563(1): 167-171 (Mar. 2006).

Kuhls-Gilcrist et al., "Accurate MTF measurement in digital radiography using noise response," *Med. Phys.*, 37(2): 724-735 (Feb. 2010).

Gureyev et al., "On the van Cittert-Zernike theorem for intensity correlations and its applications," *JOSA A*, 34(9): 1577-1584 (Sep. 2017).

\* cited by examiner

METHOD AND SYSTEM TO CALCULATE THE POINT SPREAD FUNCTION OF A DIGITAL IMAGE DETECTOR SYSTEM BASED ON A MTF MODULATED QUANTUM-NOISE MEASUREMENT

CROSS-REFERENCE TO RELATED APPLICATIONS

This patent application is a U.S. National Phase application of International Patent Application No. PCT/EP2019/085262, filed Dec. 16, 2019, which claims the benefit of European Patent Application No. 19150965.2, filed Jan. 9, 2019.

TECHNICAL FIELD

The present invention relates generally to a method to calculate the point spread function (PSF) of a digital image detector based on a measurement comprising MTF modulated quantum-noise without requiring a dedicated image acquisition of a specifically designed test object or image phantom. The method may be applied in various fields of digital imaging, and more particularly in the field of medical digital imaging where sharpness (that may be expressed as MTF) is an important objective parameter determining the image quality of a clinical imaging system. The MTF, or other parameters such as the line spread function (LSF), can be derived from the PSF.

BACKGROUND OF THE INVENTION

Digital image acquisition systems are often equipped with an array-detector, composed of a set of plane-wise arranged light-sensitive pixels, and read-out electronic circuitry to compose a digital image. Examples of these systems are the different types of static and dynamic cameras used in a vast range of applications from photography up to flat-panel detector direct radiography imaging. Image acquisition systems which incorporate a line-sensor to time-sequentially record an image are often equipped with a motion control system to scan-wise capture the digital image as a set of adjacently recorded image-lines. Other image acquisition systems as used in computed radiography applications capture their digital images by means of an intermediate, analog image storage process step followed by line-wise or flying spot-wise stimulated reemission and sampled, digital capture by a single photomultiplier or a line-sensor.

Digital x-ray imaging devices are increasingly used in medical diagnosis and are widely replacing conventional (analogue) imaging devices such as screen-film systems or analogue x-ray image intensifier television systems. It is necessary, therefore, to define parameters that describe the specific imaging properties of these digital x-ray imaging devices and to standardize the measurement procedures employed.

The point spread function (PSF) describes the response of an imaging system to a point source or point object. A more general term for the PSF is a system's impulse response, the PSF being the impulse response of a focused optical system. The PSF is the spatial domain version of the optical transfer function of the imaging system. It is a useful concept in Fourier optics, astronomical imaging, medical imaging, electron microscopy and other imaging techniques such as 3D microscopy (like in confocal laser scanning microscopy) and fluorescence microscopy. The degree of spreading (blurring) of the point object is a measure for the quality of an imaging system. The image of a complex object can then be seen as a convolution of the true object and the PSF. However, when the detected light is coherent, image formation is linear in the complex field. Recording the intensity image then can lead to cancellations or other non-linear effects.

Spatial resolution is the ability of the imaging system to resolve fine details present in an object. It also refers to the sharpness of the image. For digital imaging systems, the spatial resolution depends on the size of the pixels in the matrix. Smaller pixels will produce images with better spatial resolution compared with larger pixels. In the art, measuring the spatial resolution is a complicated process that involves at least three methods. These include imaging a bar test pattern, a sharp-edged object, or a narrow slit. While the image of the bar test pattern is easy to interpret visually for the sharpness of the lines, the latter two are more complicated. For the edged object and the narrow slit, an edge-spread function (ESF) and a line-spread function (LSF) have to be obtained, respectively. The narrower the LSF, the better the spatial resolution. The LSF can be understood as the convolution of the point spread function (PSF) over the narrow slit (or line). The three methods listed above can be used to produce yet another function called the modulation transfer function (MTF).

The MTF (Modulation Transfer Function) measurement is an important tool for the objective assessment of the imaging performance of imaging systems. Moreover, the MTF can even be calculated from the lens design data giving designers of optical systems the ability to predict system performance reliably. The manufacturer can then compare the image quality of real lenses with the expectations from the design phase. The MTF, describing the resolution and performance of an imaging system, is the ratio of relative image contrast divided by relative object contrast.

$$MTF = \frac{\text{Relative Image Contrast}}{\text{Relative Object Contrast}}$$

When an object (such as an exposed target) is observed with an imaging system, the resulting image will be somewhat degraded due to inevitable aberrations and diffraction phenomena. In optical imaging systems, manufacturing errors, assembly and alignment errors in the optics will deteriorate the overall imaging performance of the system. In x-ray imaging systems, x-ray scatter accounts for this inevitable deterioration. As a result, in the image, bright highlights will not appear as bright as they do in the object, and dark or shadowed areas will not be as black as those observed in the original patterns. In general an illuminated (or x-ray exposed) target can be defined by its spatial frequency (number of bright and dark areas per millimeter) and the contrast (the apparent difference in brightness between bright and dark areas of the image).

By convention, the modulation transfer function is normalized to unity at zero spatial frequency. For low spatial frequencies, the modulation transfer function is close to 1 (or 100%) and generally falls as the spatial frequency increases until it reaches zero. The contrast values are lower for higher spatial frequencies. As spatial frequency increases, the MTF curve falls until it reaches zero. This is the limit of resolution for a given imaging system or the so called cut off frequency. When the contrast value reaches zero, the image becomes a uniform shade of grey.

For x-ray imaging systems, the standardized measurement method for the DQE (Detective Quantum Efficiency) and MTF is published as an international IEC standard ("IEC 62220-1-1: Medical electrical equipment—Characteristics of digital x-ray imaging devices—Part 1-1: Determination of the detective quantum efficiency—Detectors used in radiographic imaging"). The measurement method relies on a very specific measurement phantom exposure that involves a 1.0 mm thick tungsten edge device.

The technique of the slanted edge can be described as follows: first, image the vertically oriented edge (or a horizontal one for the MTF measurement in the other direction) onto the detector. The vertical edge needs to be slightly tilted with respect to the columns of the sensor. The exact tilting is of no importance, it is advisable to have a tilt of minimum 2° and maximum 10° w.r.t. the column direction. A tilt within these limits gives the best and most reliable results for the MTF characterization. Each row of the detector gives a different Edge Spread Function (ESF), and the Spatial Frequency Response (SFR) of the slanted edge can be "created" by checking the pixel values in one particular column that is crossing the imaged slanted edge.

Based on the obtained SFR, the Line Spread Function (LSF) can be calculated, the LSF is simply the first derivative of the SFR. Next and final step is calculating the Fourier transform of the LSF. This results in the Modulation Transfer Function, because the MTF is equal to the magnitude of the optical transfer function, being the Fourier transform of the LSF. Plotting the MTF as a function of the spatial frequency can be done after normalizing the MTF to its DC component and normalizing the spatial frequency to the sampling frequency.

There is general consensus in the scientific world that the DQE is the most suitable parameter for describing the imaging performance of a digital x-ray imaging device. The DQE describes the ability of the imaging device to preserve the signal-to-noise ratio from the radiation field to the resulting digital image data. Since in x-ray imaging, the noise in the radiation field is intimately coupled to the air kerma level, DQE values can also be considered to describe the dose efficiency of a given digital x-ray imaging device.

The overall concept of the DQE for a digital detector is that the detector receives an input exposure (incident quanta) and converts it into a useful output image. The DQE is a measure of the efficiency and fidelity with which the detector can perform this task. Note that in addition the DQE takes into consideration not only the signal-to-noise ratio (SNR) but also the system noise and therefore includes a measure of the amount of noise added. The DQE can be calculated using the following relationship:

$$DQE = \frac{SNR_{out}^2}{SNR_{in}^2}$$

The DQE for a perfect digital detector is 1, or 100%. This means that there is no loss of information. Since $SNR_{in}$ takes into consideration the amount of exposure used and the $SNR_{out}$ considers the resultant image quality, the DQE indicates the detector performance in terms of output image quality and input radiation exposure used.

As can be seen from the formula below, the sharpness of a system is an important component of the DQE of a digital imaging system:

$$DQE(u) = MTF(u)^2 \cdot G^2 \cdot \frac{q}{W_{out}(u)}$$

wherein u is the spatial frequency variable in cycles per millimeter, q is the density of incident x-ray quanta in quanta per square millimeter, G is the system gain relating q to the output signal for a linear and offset-corrected detector, MTF(u) is the system modulation transfer function, and $W_{out}(u)$ is the image Wiener noise power spectrum corresponding to q. DQE can be calculated from the MTF, and the MTF influences the DQE quadratically.

SUMMARY OF INVENTION

The present invention provides a method to determine a point spread function PSF of an image detector system, as set out in claim 1.

In the context of this invention, the image detector system may be a visible light detector system comprising optics (such as used in a digital photo camera), but is not limited to the use in the visible part of the light spectrum. Also infrared or ultraviolet detector systems may be used. The image detector system may also be a digital x-ray imaging system, consisting of a digital x-ray image detector. The invention may also be applied in astronomical imaging, electron microscopy, other imaging techniques such as 3D microscopy (like in confocal laser scanning microscopy) and fluorescence microscopy.

While the invention will be described in more detail in the context of digital x-ray imaging, it may thus be applied to other types of imaging detector systems as well, since there is no difference in the way the input signal (i.e. an image comprising a detectable amount of quantum noise) may be acquired.

The digital image I[X, Y] referred to in this invention has to be understood as an image acquisition which is made within the default parameter settings range of the image detector system. The image detector system should thus be configured and exposed such that the obtained image is neither underexposed nor overexposed (at least in the spatial sample area R[x', y']).

The digital image I[X, Y] is preferably suitably pre-calibrated, which means that certain hardware specific calibrations or corrections are applied to the image before subjecting it to the method of the invention. The pre-calibrations are for instance; 1) pixel value offset subtractions (removal of signal values caused by thermal effects in the image detector system), 2) pixel gain corrections (correcting the gain parameters applied to the signal amplification), 3) compensations for pixel-, cluster- and line defects.

One minimum requirement of said digital image I[X, Y] is that at least a portion from it (which is called the spatial sample area R[x', y']) is substantially homogeneously exposed. "Substantially" means in this context that there are no clear intended structural objects visible in the image that cause image signal variations against the recorded background of more than 1%. The method of the invention performs best when the only signal in the image sample area (after normalization) would only consist of transfer function modulated quantum noise, i.e. quantum noise that is modified (modulated) only by its passage through the image detector system. The quantum noise is induced during image acquisition due to the impinging photons on the digital image detector.

The sample area R[x', y'] has to be understood as a preferably contiguous sub-area of the digital image I[X, Y], of which all pixels are exposed under said substantially homogeneously exposure conditions. For a visible light image detector system, this would mean that all detector pixels in the sample area capture an homogeneously illuminated area of an object, which would show up in the image as a homogenously bright area.

For a digital x-ray imaging detector system, the sample area would preferably be an area in the image which is substantially homogeneously exposed by the x-ray source. For this purpose, a flat field exposure may be considered to be the most suitable way to achieve this objective. A flat field exposure, often referred to as a white field or gain field, is acquired with x-ray illumination, but without the presence of the imaged object. A flat field exposure thus offers homogeneously exposed sample areas over its entire surface.

A less obvious choice would be to try identifying suitable sample areas in clinical x-ray images that are comprising body parts of a patient. Nevertheless, most of such clinical images do offer opportunities to identify such areas, as the image area required for performing the method successfully is relatively limited. A suitable sample area spanning 100× 100 pixels would largely suffice when applying a kernel size for $k_{i \times j}$ of 21×21. The areas most suitable would be the ones wherein the digital image detector was directly exposed to the x-ray source (i.e. areas in the image which have not been obstructed by body parts of the patient). Many conventional x-ray exposure techniques result in images wherein the body part under investigation does not entirely cover the detector surface.

In the context of this invention, a peripheral sensing kernel $k_{i \times j}$ is a mathematical representation of a set of symmetrically arranged pixels around a central point, this central point making up the center of the peripheral sensing kernel. This sensing kernel is called "peripheral" as its shape determines the periphery with respect to a central point wherein the PSF (point spread function) is calculated. The peripheral sensing kernel is symmetric around the x- and y-axis, and may take the shape of a square or a circle (for isotropic blurring), or a rectangle or an ellipse (for anisotropic blurring).

The size of the kernel $k_{i \times j}$ thus determines the accuracy (or resolution) at which the PSF is calculated. In practice, the size of kernel $k_{i \times j}$ is defined by $$i=2n+1; n \in \mathbb{N}$$

and $$j=2m+1; m \in \mathbb{N}$$

In the case that n=m, the kernel $k_{i \times j}$ is square or circular, and will be used for the determination of an isotropic PSF. In the other case, an anisotropic PSF (of which the width in x- and y-direction are different) will be obtained and a rectangular or elliptic kernel will be applied, having a different aspect ratio. The application of an anisotropic kernel is in this method advisable in case the image detector system is expected to behave differently in the x- and y-direction. This may be the case when using detector arrays with non-square pixels, or for instance when the detector read-out technique induces non-isotropic responses; which is for instance the case with different CR (computed radiography) digitizer systems. A CR digitizer may for instance read out a phosphor detector plate using a so-called "flying spot" laser which sweeps over the phosphor plate's surface, resulting in a line-by-line image (re-)construction. This results in an anisotropic pixel sensitivity due to the difference in read-out in the fast scan direction (direction of the line wise read-out) and the slow scan direction.

In case of a elliptic (where i≠j) or circular (where i=j) kernel $k_{i \times j}$, it has to be understood that only the pixels in the ellipse defined by its axes x and y around the central point are considered for the calculations. This is different from the case where square or rectangular kernels are considered.

A pixel value background $B_L$ of a local pixel L(x, y) is defined as the average of all of the image pixel values of the pixels that are located within a background region that is centered on said local pixel L(x, y). A background value $B_L$ is calculated for a certain pixel in a digital image in order to calculate the deviation of the local pixel value of pixel L(x, y) in comparison with its surrounding neighbors.

In this method, the initial choice of the size of the peripheral sensing kernel $k_{i \times j}$ determines the accuracy (resolution) of the PSF determination area, and thus the returned result.

The invention is advantageous in that the measurement signal that is used for the calculation of the point spread function (PSF) is an exposure that does not involve the application or use of special measurement patterns (digital photography) or phantoms (x-ray digital imaging). The invention thus allows the calculation of the PFS based on the use of standard image acquisitions, in the sense that no special measurement phantoms are required to obtain such a suitable input image.

Another advantage of the invention is that the obtained PSF can be used to calculate or derive the sharpness (MTF) of the image system from it, using the mathematical methods known in the art.

The present invention can be implemented as a computer program product adapted to carry out the steps as set out in the description. The computer executable program code adapted to carry out the steps set out in the description can be stored on a computer readable medium.

Since the method of this invention can be implemented as a computer program that it is instructed to select a suitable input image (that is acquired under substantially homogeneously exposure conditions) from a set of available input images (that are for instance created during the normal operations of a radiology department service), it may furthermore be implemented as a sharpness monitoring service, that continuously calculates and monitors the sharpness of a digital imaging system. Such computer program may be configured to respond to changes in sharpness measurements, or to respond when certain thresholds are exceeded. The computer program may for instance trigger a maintenance operation to be executed on the digital imaging system. The enormous advantage of this method is that no scheduled and intrusive image quality measurements have to be performed at regular intervals at the expense of operational time of the system, and that all measurements can run in the background without any disturbance for the user (due to scheduled interventions of the operator).

Further advantages and embodiments of the present invention will become apparent from the following description and drawings.

BRIEF DESCRIPTION OF DRAWINGS

FIG. 1: shows a spatial representation (marked by an X-/Y-axis) and a temporal representation (indicated by $t_{1-1}$, $t_i$, $t_{i+1}$, $t_{now}$) of a digital image I[X,Y] (of size X×Y) captured by a digital image acquisition system. The area [100] represents a sample area R within the image I that comprises image data meeting the requirements for performing the method. The diagram depicts the relative locations of a local pixel "L" and a neighbourhood pixel "N" within their background region (respectively [101] and [102]). [103] represents the point-spread-function determination area around the local pixel "L". The final calculated PSF (which is the calculation result of the method of this invention) will fit into this PSF determination area, and determines the accuracy (resolution) of the calculated result.

The exploded view on the right side of the drawing depicts a spatial arrangement of a local pixel L, a close neighbour pixel $N_1$ and a far neighbour pixel $N_2$, all part of a sample area located in the digital image, as located inside the point-spread-function determination area perimeter [103] of said local pixel.

DESCRIPTION OF EMBODIMENTS

In the following detailed description, reference is made in sufficient detail to the above referenced drawings, allowing those skilled in the art to practice the embodiments explained below.

The method of the invention intends to calculate the PSF (point-spread function) of a digital detector system based on a sufficiently large amount of sample image data acquired by said digital detector system. As such, two very different ways of collecting such sufficiently large amount of data can be considered; the first is to identify the large number of samples in the spatial domain (meaning that the data are collected at different locations in the image), the second to identify the samples in the temporal (time) domain (meaning that the different sample data are collected in images created at different moments in time). In the following explanation, further emphasis will be given to the embodiment in which the spatial domain is sampled to obtain the required data.

In a preferred embodiment, will the method require that a so-called sample area, which may be preferably square or rectangular in shape and whose surface area is preferably (but not necessarily) contiguous, can be obtained from an image that is acquired by the digital detector system in question. The sample area R is thus defined as a selected portion of the digital image I:

$$R \subset I$$

Since the method of the invention is based on the analysis of the quantum noise that is modulated by the transfer function of the digital imaging system, it is a prerequisite that this quantum noise may be extracted from the data in the sample area, and its surroundings (see further). It is therefore preferable that no objects would obstruct the sample area during exposure, such that the measurements of the quantum noise could be disturbed. It is thus preferable to select the sample area in the digital image such that the pixels of the sample area are exposed under substantially homogeneously exposure conditions, meaning that their respective measurement values would be influenced by variations induced by quantum noise rather than disturbances on the surface of the imaged object (for visible light) or disturbances induced by inhomogeneities obstructing the digital x-ray detector during exposure (for radiographic images). For a visible light image detector system, this would mean that all detector pixels in the sample area capture an homogeneously illuminated area of an object, which would show up in the image as a homogenously bright area. For a digital x-ray imaging detector system, the sample area would preferably be an area in the image which is substantially homogeneously exposed by the x-ray source.

As a next step, in a preferred embodiment of the invention, the sample data acquired as unprocessed data, may be subsequently pre-processed in such way as to remove the DC component from the image signal as much as possible. This may be achieved by for instance destriping (taking out known column- or row-artefacts that may occur in certain imaging devices), and/or for instance by normalization, meaning that the values of the pixels in the sample area R are divided by their mean value (i.e. the sum of all pixel values in the background region divided by the number of pixels in the background region). This way, any known background signal is removed from the data in order to obtain a raw data set that only contains the transfer function modulated quantum noise.

The next step is the selection of the peripheral sensing kernel $k_{i \times j}$ which is essentially defined by its shape and size. The peripheral sensing kernel defines the set of pixels N around a local pixel L(x, y) that will be evaluated to assess whether (and how much) their (pixel) value corresponds from the local pixel value from L(x, y) (local pixel L is an element of sample area R, and has coordinates (x, y)):

$$L(x,y) \in R[x',y']$$

The peripheral sensing kernel thus defines which neighboring pixels N will be evaluated to see whether or not their pixel value can be correlated with the local pixel in the image sample (or with the central pixel of the sensing kernel k). This correlation is not a straightforward process that can be directly applied to the local pixel value and the neighboring pixel values, as will be explained hereafter. The term "sensing" kernel is chosen because the kernel will be moved and applied along all pixels in the sample area R.

The selection of the size of the sensing kernel $k_{i \times j}$ determines the accuracy and extent for which the PSF will be calculated; therefore its size should be chosen to match the expected size of the outcome for a certain digital image detector system. The size of the sensing kernel is expressed in pixels×pixels, and thus matches the true dimensions of the pixel matrix if the imaging detector itself.

The shape of the peripheral sensing kernel may be chosen to be circular or square when it is expected that the digital image detector system shows isotropic behavior. In this case, an isotropic sensing kernel (circular or square) is chosen. This means that it is expected that the sharpness of a pixel is expected to be independent of the direction pixels; the sharpness is equal in both X- and Y-direction. The shape of the peripheral sensing kernel may be chosen to be elliptic or rectangular (i.e. an anisotropic sensing kernel) in the case that the digital image detector system is expected to perform differently in X- and Y-direction, or that it shows anisotropic behavior. The choice between a circular or square kernel is not very important for the accuracy of the calculated result, but a square shaped kernel may be more practical when performing the calculations with a computer system.

In the next step of the method of this invention, the calculation of the PSF is explained for one local pixel L(x, y). This local pixel L(x, y) is selected from the sample area R[x', y'] that was defined above. Later on, the same calculation will be performed for all pixels within the sample area R[x', y'] in order to obtain more accurate results thanks to a higher number of samples.

For one local pixel L(x, y), first, its background-deviation is calculated, this background deviation being the deviation of the pixel value at pixel L(x, y) relative to its own background value val($B_L$). The background value val($B_L$) is calculated as the median or the average value of all values in the so-called background region $B_L$ around pixel L(x, y) (refer to FIG. 1 as [101]). The deviation of the pixel value val(L) at pixel L(x, y) is thus a measure of the local signal intensity val(L) normalized against its own background value val($B_L$), $$\Delta L = \left[\frac{val(L)}{val(B_L)}\right] - 1$$

Figure 2A:
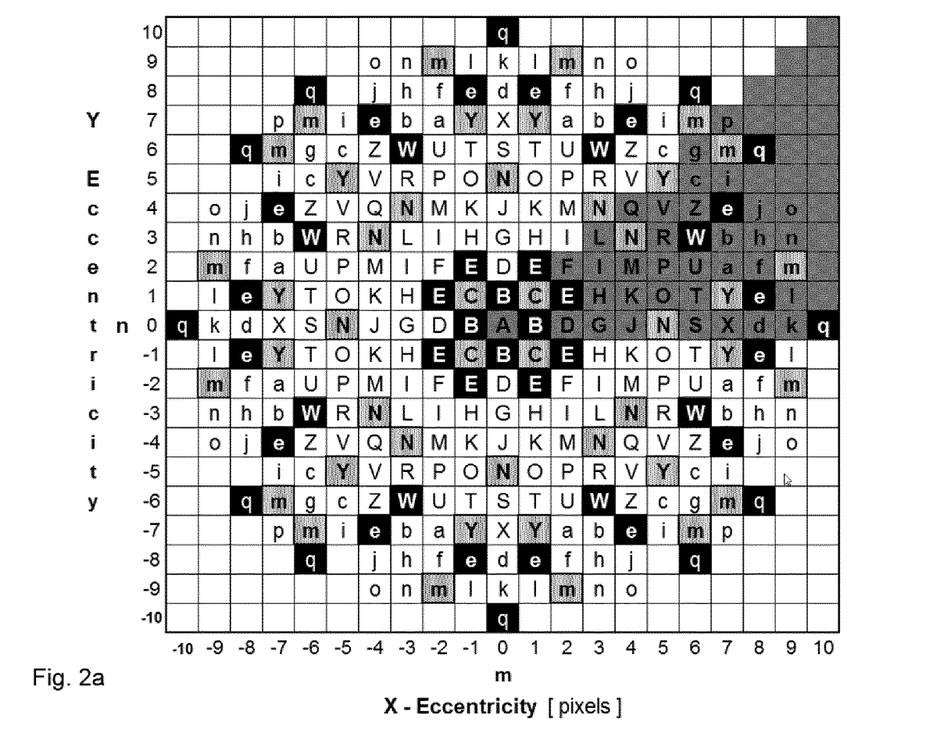
FIG. 2a: shows a spatial arrangement of a circular peripheral sensing kernel of size 21×21, in which groups of pixels with identical eccentricities are shown as a character symbol. All pixels that are marked with the same character symbol are neighbouring pixels $N_d$ of the central pixel (which is marked "A") that are lying at a same distance d. It should be noted the different groups of $N_d$ may be considered to be located on concentric circles. Such a circular peripheral sensing kernel will be used for the analysis of isotropic sharpness.
Figure 2B:
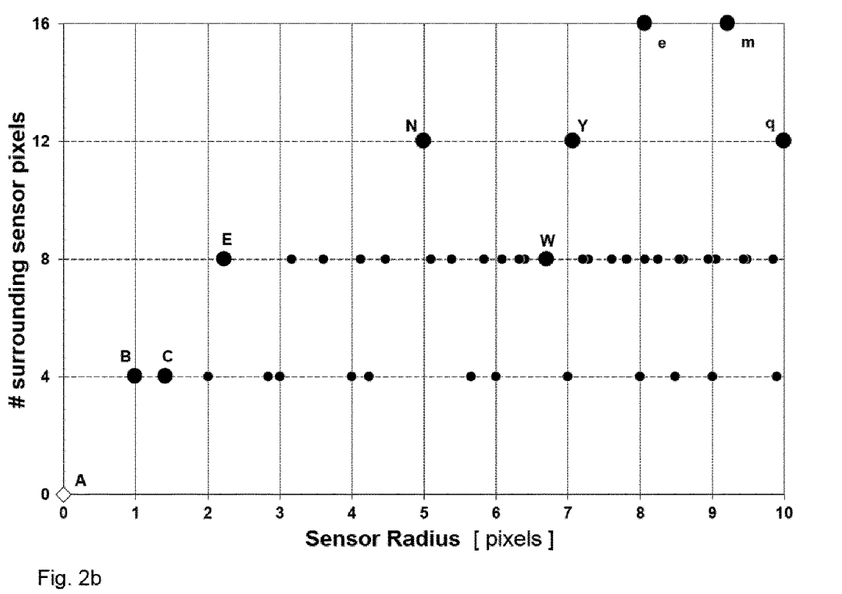
FIG. 2b: shows the frequency distribution (i.e. the number of members in group of pixels sharing the same distance d from the central pixel) of the peripheral sensing kernel of FIG. 2a of size 21×21, and this in function of their respective eccentricities (i.e. their distances from the central pixel L).
Figure 3A:
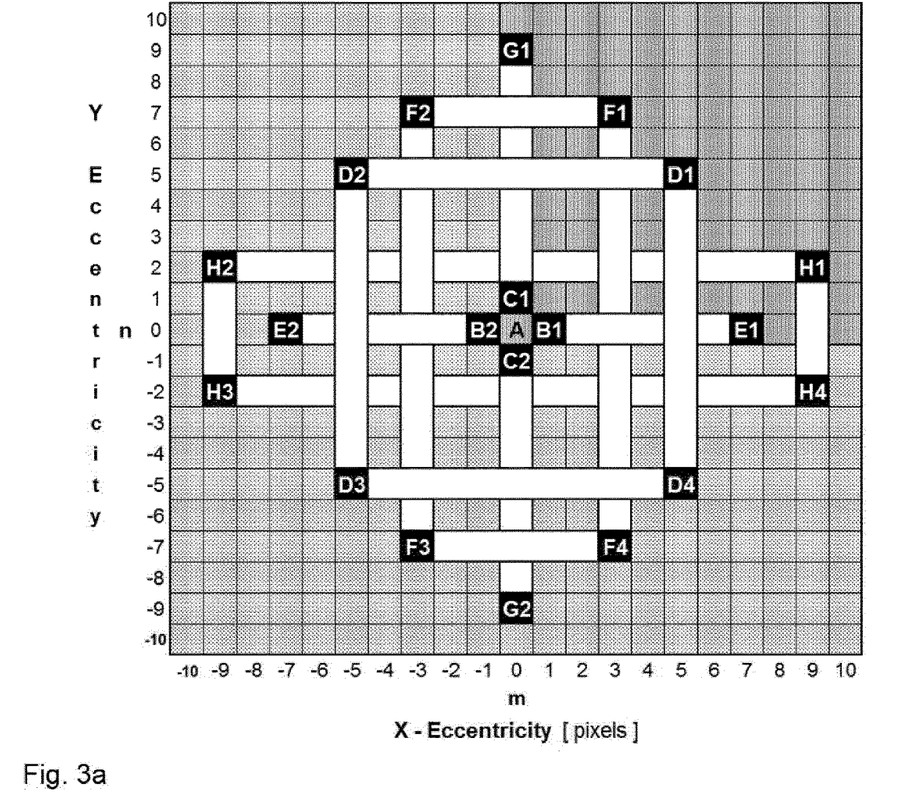
FIG. 3a shows a spatial arrangement of a peripheral sensing kernel in which groups of pixels with identical eccentricities, but different directions are grouped, and are marked with the same capital character. The groups of neighbouring pixels lying at the same distance d from the central pixel (marked with "A") are located at the corners of a rectangle. Such configurations of a peripheral sensing kernel are used for the analysis of anisotropic sharpness.
Figure 3B:
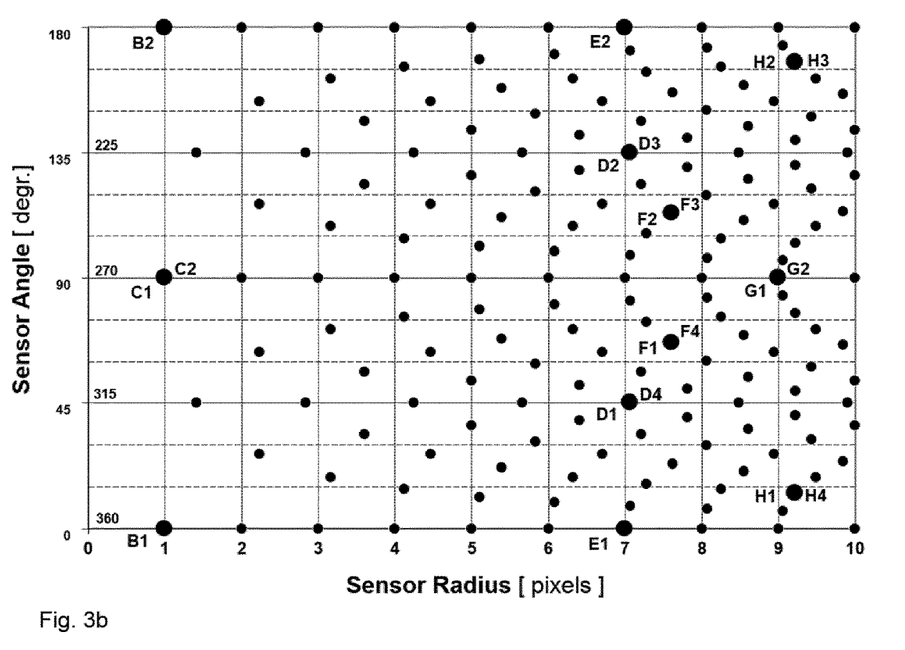
FIG. 3b shows the angular distribution of the peripheral sensing kernel of FIG. 3a, and this in function of their respective eccentricities (i.e. their distances from the central pixel L).
Figure 4A:
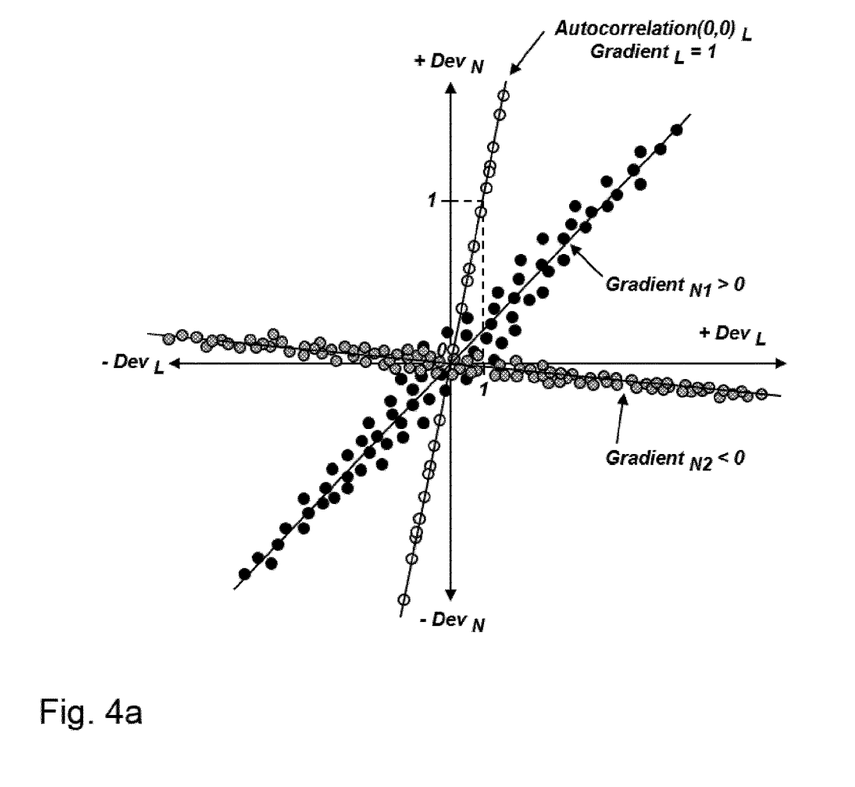
FIG. 4a: shows a graph representing the background-deviation of a chosen, local pixel L on the horizontal axis and the related background-deviations of a selected close neighbour pixel $N_1$ and of a selected far neighbour pixel $N_2$ on the vertical axis along with the autocorrelation gradient reference line of the chosen, local pixel. Each slope gradient represents a correlation coefficient between said background deviation of the local pixel L and the background deviation of a neighbouring pixel $N_d$ at a certain distance d from the local pixel L. The different measurement points grouped around the slope gradient (gradient$_{N1}$, gradient$_{N2}$, . . . ) are obtained through similar calculations for different pixels L in the sample area. More measurement pixels will lead to a better estimation of the correlation coefficient for a certain number of pixels at the same distances d.
Figure 4B:
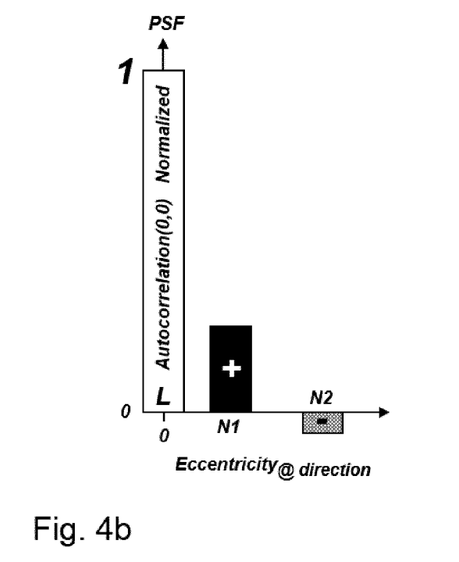
FIG. 4b: shows a Point-Spread-Function bar-graph representing the calculated individual, positive and negative spatial correlation coefficient results relative to the autocorrelation peak normalized correlation integral for all the local pixels inside the selected region of interest (sample area) located in the digital image.

Subsequently, but still for the same pixel L(x, y), secondly, a similar calculation is made for each group of neighbouring pixels $N_d$ that share the same distance d from pixel L(x, y) in the peripheral sensing kernel $k_{i \times j}$. For an isotropic sensing kernel, the pixels making up this group lie on a circle around the central pixel L(x, y). In the case of applying an anisotropic sensing kernel, this group of neighbouring pixels $N_d$ share the same distance d from pixel L(x, y) in the peripheral sensing kernel $k_{i \times j}$, but additionally are line symmetric around the X- and Y-axis (which implies that they may also lie on a concentric ellipse rather than on a circle). Said group of neighbouring pixels $N_d$, comprises the pixels $N_{d1}$, $N_{d2}$, . . . , $N_{dn}$, also noted as $N_{d(1 \to n)}$. These groups of neighbouring pixels $N_d$ are shown in FIGS. 2a and 3a as having respectively the same character symbol or character symbol prefix. The n corresponds to the "#of surrounding sensor pixels" for a certain group $N_d$ (in the isotropic case, a group of pixels is defined as having the same eccentricity d as illustrated in the example of FIG. 2b).

val($N_{d1}$) is the pixel value of a neighbouring pixel $N_{d1}$ of L(x, y) that is located at a distance d from pixel L(x, y) at location $N_{d1}$. In other words, val($N_{d1}$) is the value of a neighbouring pixel $N_{d1}$ of L(x, y) with eccentricity d. More neighbouring pixels $N_{di}$ (namely $N_{d2}$, . . . , $N_{dn}$) share the same distance d with $N_{d1}$, and have different pixel values val($N_{di}$).

Figure 1:
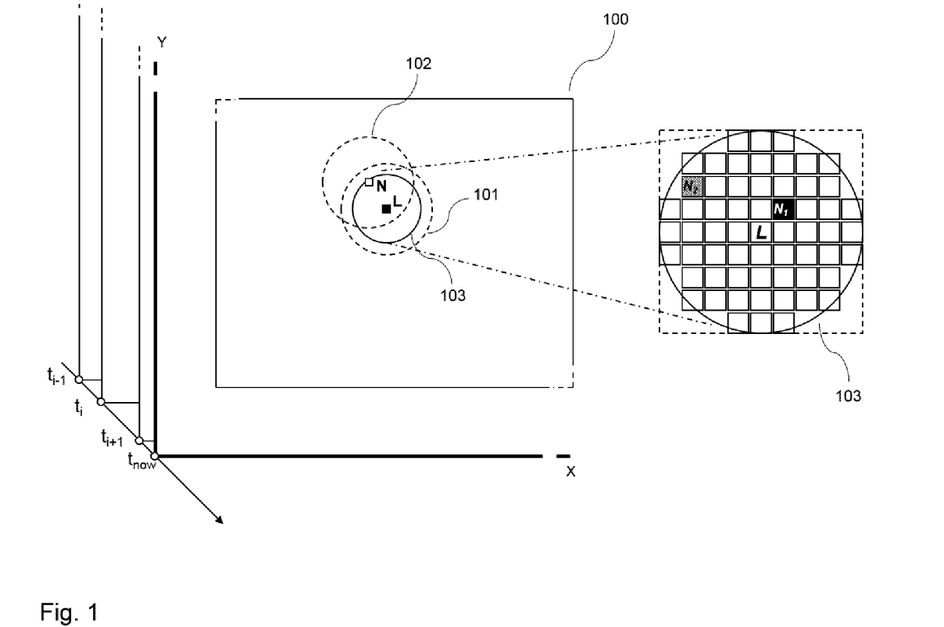

Thus, for each group of neighbouring pixels $N_d$ that share the same distance d from pixel L(x, y), the median (or mean) deviation $\Delta \overline{N}_d$ of all background normalized neighbouring pixels $N_{d(1 \to n)}$ at the same distance d from L(x, y) is calculated as, $$\Delta \overline{N}_d = median_{i=1}^{n}\left[\left[\frac{val(N_{d(i)})}{val(B_{N_{d(i)}})}\right] - 1\right]$$

or, $$\Delta \overline{N}_d = mean_{i=1}^{n}\left[\left[\frac{val(N_{d(i)})}{val(B_{N_{d(i)}})}\right] - 1\right]$$

wherein $\overline{N}_d$ is the median (or alternatively, mean) pixel value of all neighbouring pixels $N_{d(1 \to n)}$ at a same distance d(from L(x, y)), whereas the background value val($B_{N_{d(i)}}$) of each $N_{d(1 \to n)}$ is calculated as the median (or mean) value of all values in the so-called background region $B_{N_{d(i)}}$ around pixel $N_{d(1 \to n)}$ (refer to FIG. 1 as [102]).

As a next step, we calculate the autocorrelation peak value for the sample area R[x', y'] by autocorrelating $\Delta L$ for all local pixels L(x, y) in the sample area for a spatial phase shift (0,0) pixels (i.e. no spatial phase shift) as follows:

$$AutoCorrelationPeak(R[x',y']) = \Sigma\Sigma_{x=0,y=0}^{R[x',y']} \Delta L^2$$

This autocorrelation peak value is a single value that is calculated for the entire sample area, and will be used later on to normalize the correlation values of $\Delta L$ with $\Delta \overline{N}_d$ for a distance d from local pixel L(x, y).

Subsequently, for all pixels in the sample area R[x', y'] the correlation between $\Delta L$ and $\Delta \overline{N}_d$ for the different distances (or eccentricities) d from the central pixel is calculated. This is achieved by summing the correlation values of $\Delta L$ with $\Delta \overline{N}_d$ for a distance d from local pixel L(x, y) over all pixels in the sample area R[x', y'], as follows:

$$Correlation(\Delta L, \Delta \overline{N}_d) = \Sigma\Sigma_{x=0,y=0}^{R[x',y']} \Delta L \cdot \Delta \overline{N}_d$$

Different correlation values are thus calculated for the different distances (or eccentricities) d.

The PSF($N_d$) or the point spread function value for that group of neighbouring pixels $N_d$ is calculated as the autocorrelation peak normalized correlation value for that group of neighbouring pixels $N_d$:

$$PSF(N_d) = \frac{\text{Correlation}(\Delta L, \Delta \overline{N}_d)}{\text{AutoCorrelationPeak}(R[x', y'])}$$

Each calculated value PSF($N_d$) corresponds to a $PSF_{xy}$ value for all pixel at the pixel locations $N_{d1}, N_{d2}, \ldots, N_{dn}$, that are sharing the same group of neighbouring pixels $N_d$ around central pixel L. Or when referring to FIG. 2a or 3a, the calculated value PSF($N_d$) returns the $PSF_{xy}$ value for all the pixels labelled with a same character (in FIG. 2a) or same character prefix (in FIG. 3a). When calculating the above PSF($N_d$) values for all groups of neighbouring pixels $N_d$ around a central pixel, we obtain the entire 2-dimensional point spread function $PSF_{xy}$. This 2-dimensional point spread function $PSF_{xy}$ is obtained as a 2-dimensional matrix in the shape and size of the selected peripheral sensing kernel $k_{i \times j}$.

Figure 5:
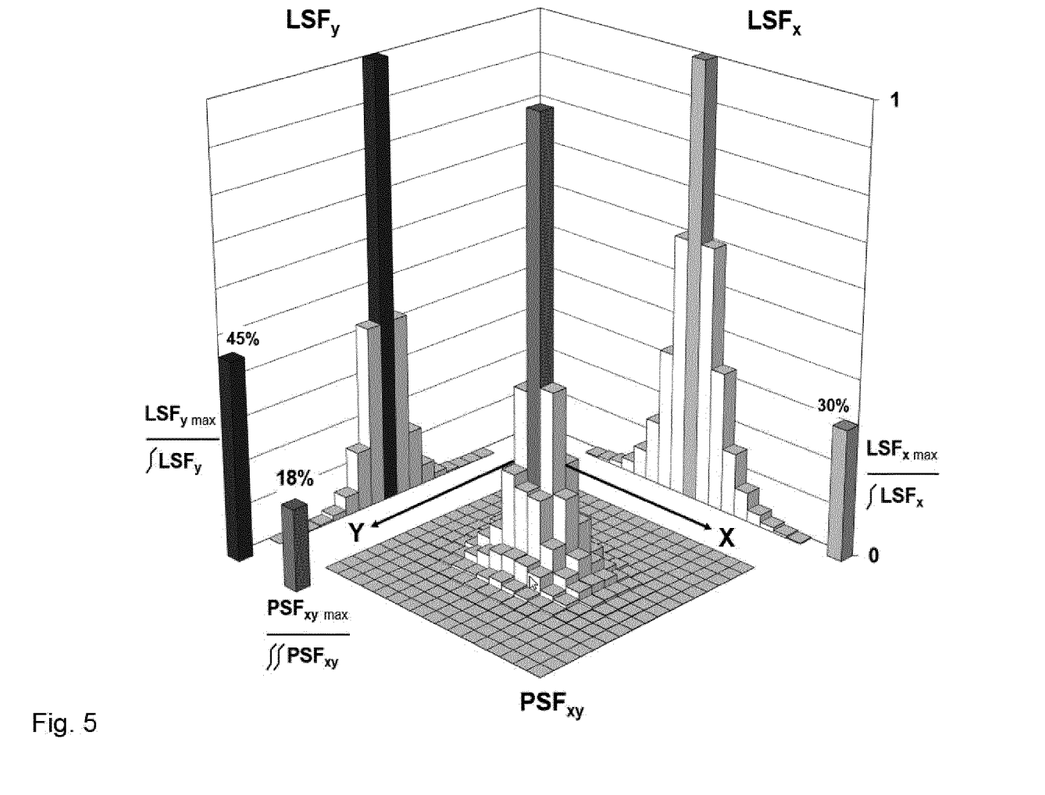
FIG. 5: shows the spatial and planar representations of the calculated Point-Spread-Function components and their calculated corresponding Line-Spread-Functions in both main directions of the digital image along with their Center-to-Total Fraction ratios.

The obtained result is a two dimensional matrix $PSF_{xy}$ (see FIG. 5) that can be easily converted into a line spread function (LSF) in either direction X or Y by summing up all row values of the matrix onto a one-dimensional array (which may then be normalized again).

Also other sharpness related quality parameters may be calculated from the above $PSF_{xy}$ data using methods described in the art.

Conclusively, it has to be noted that the choice of the size of the sensing kernel thus also defines the size requirement of the sample area around the local points L(x, y) which are going to be investigated. Since i×j pixels N around local pixel L(x, y) are going to be considered for assessing their correlation with their respective backgrounds $B_N$ (which again expands the need for suitable measurement data around these neighbouring pixels N), the area around the actual set of local pixels that can be subjected to the calculation of this method should be expanded with the radius of the peripheral sensing kernel $k_{i \times j}$ [103] and the radius of the background region [102] of N. The sample area must thus be sufficiently large as to cover for each measurement point a surface that exceeds the selected sensing kernel $k_{i \times j}$ [103] expanded with the considered background region [102] for each of the pixels in said sensing kernel $k_{i \times j}$. This means that in practice that the useable pixels in the sample area will be limited to the pixels which lie at approximately 2 times the sensing kernels' radius away from the sample area's edge (assuming that the size of the sensing kernel $k_{i \times j}$ is (almost) the same as the background considered per neighbouring pixel N).

Therefore, alternatively, the sample area (although preferably covering a contiguous surface) may also be conceived as a randomly scattered set of isolated pixels that are distributed across the image area, provided that the regions of interest [102] of all neighbouring pixels N of the local pixel L meet the same acquisition criteria as discussed earlier for the sample area.

The invention claimed is:

1. A method to determine a point spread function $PSF_{xy}$ of a digital image detector system, comprising the steps of:
   acquiring a set of image pixel values comprising transfer function modulated quantum noise in a spatial sample area R[x', y'] of a digital image I[X, Y] wherein no structural objects are present that cause image signal variations against the recorded background of more than 1%,
   determine a peripheral sensing kernel $k_{i \times j}$ wherein the pixel values matrix k [x, y] is centred on a central pixel,
   calculating for each local image pixel L(x, y) in said sample area R[x', y']:
      a pixel deviation $\Delta L$ between a pixel value at pixel L(x, y) and its background value val($B_L$), wherein val($B_L$) is defined as the median or mean value of all values in a background region $B_L$ centred on said local pixel L(x, y), and
      a median or mean pixel deviation $\Delta \overline{N}_d$ of all background normalized neighbouring pixels values val($N_{d(1 \to n)}$)=val($N_{d1}$), val($N_{d2}$), ..., val($N_{dn}$) that are located at the same distance d from said local image pixel L(x, y) and that are normalized against their respective background value val($B_{N_{d(i)}}$), wherein val($B_{N_{d(i)}}$) is defined as the median value of all pixel values in a background region $B_{N_{d(i)}}$ centred on said neighbouring pixels $N_{d(i)}$,
   calculating an autocorrelation peak value by autocorrelating $\Delta L$ for all local pixels L(x, y) in the sample area R[x', y'], as $\text{AutoCorrelationPeak}(R[x',y']) = \Sigma\Sigma_{x=0,y=0}^{R[x',y']} \Delta L^2$ calculating $PSF_{xy}$ as $$PSF(N_d) = \frac{\text{Correlation}(\Delta L, \Delta \overline{N}_d)}{\text{AutoCorrelationPeak}(R[x', y'])}$$

for all values of distance d from a central pixel as defined in peripheral sensing kernel $k_{i \times j}$, where Correlation($\Delta L, \Delta \overline{N}_d$) is obtained by correlating $\Delta L$ with $\Delta \overline{N}_d$ for a distance d from local pixel L(x, y), and by summing the results over all pixels in the sample area R[x', y'], $\text{Correlation}(\Delta L, \Delta \overline{N}_d) = \Sigma\Sigma_{x=0,y=0}^{R[x',y']} \Delta L \cdot \Delta \overline{N}_d$.

2. The method according to claim 1, wherein the spatial sample area R[x', y'] has one of the following shapes: circle, square, ellipse, rectangle or point cloud.

3. The method according to claim 1, wherein the image pixel values in said sample area R[x', y'] of a digital image I[X, Y] are normalized after their acquisition.

4. The method according to claim 1, wherein the image pixel values in said sample area R[x', y'] of a digital image I[X, Y] are destriped after their acquisition.

5. The method according to claim 1, wherein the peripheral sensing kernel $k_{i \times j}$ has one of the following shapes: circle, square, ellipse or rectangle.

6. The method according to claim 3, wherein a mean pixel deviation $\Delta \overline{N}_d$ is calculated of all background normalized image pixel values of neighbouring pixels $N_d$ that are located at a distance d from said local image pixel L(x, y).

7. A computer program stored on a non-transitory computer readable medium comprising instructions which, when the program is executed by a computer, cause the computer to carry out the steps of the method of claim 1.

8. A non-transitory computer readable medium comprising program instructions which, when the program is executed by a computer, cause the computer to carry out the steps of the method of claim 1.

9. The method according to claim 2, wherein the image pixel values in said sample area R[x', y'] of a digital image I[X, Y] are destriped after their acquisition.

10. The method according to claim 2, wherein the peripheral sensing kernel $k_{i \times j}$ has one of the following shapes: circle, square, ellipse or rectangle.

11. The method according to claim 3, wherein the image pixel values in said sample area $R[x', y']$ of a digital image $I[X, Y]$ are destriped after their acquisition.

12. The method according to claim 3, wherein the peripheral sensing kernel $k_{i \times j}$ has one of the following shapes: circle, square, ellipse or rectangle.

13. The method according to claim 4, wherein the peripheral sensing kernel $k_{i \times j}$ has one of the following shapes: circle, square, ellipse or rectangle.

14. The method according to claim 4, wherein a mean pixel deviation $\Delta \overline{N}_d$ is calculated of all background normalized image pixel values of neighbouring pixels $N_d$ that are located at a distance d from said local image pixel $L(x, y)$.

15. The method according to claim 5, wherein a mean pixel deviation $\Delta \overline{N}_d$ is calculated of all background normalized image pixel values of neighbouring pixels $N_d$ that are located at a distance d from said local image pixel $L(x, y)$.

16. A computer program stored on a non-transitory computer readable medium comprising instructions which, when the program is executed by a computer, cause the computer to carry out the steps of the method of claim 2.

17. A non-transitory computer readable medium comprising program instructions which, when the program is executed by a computer, cause the computer to carry out the steps of the method of claim 2.

18. A computer program stored on a non-transitory computer readable medium comprising instructions which, when the program is executed by a computer, cause the computer to carry out the steps of the method of claim 3.

19. A non-transitory computer readable medium comprising program instructions which, when the program is executed by a computer, cause the computer to carry out the steps of the method of claim 3.

\* \* \* \* \*